(12) United States Patent
Gilpin

(10) Patent No.: US 6,476,373 B1
(45) Date of Patent: Nov. 5, 2002

(54) METHOD AND APPARATUS FOR SECURING A FLATBED SCANNER CARRIAGE

(75) Inventor: Kenneth J. Gilpin, Fort Collins, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/834,502

(22) Filed: Apr. 12, 2001

(51) Int. Cl.[7] .............................................. H01L 27/00
(52) U.S. Cl. ..................................... 250/208.1; 358/497
(58) Field of Search ............................. 250/208.1, 239; 358/474, 493, 494, 482, 484, 497

(56) References Cited

U.S. PATENT DOCUMENTS

| | | | |
|---|---|---|---|
| 3,959,628 A | * | 5/1976 | Haydon ................ 235/61.11 E |
| 6,040,572 A | | 3/2000 | Khovaylo et al. .......... 250/235 |
| 6,172,360 B1 | | 1/2001 | Khovaylo et al. .......... 250/235 |
| 6,226,252 B1 | | 5/2001 | Coffin et al. ................. 369/178 |
| 6,271,939 B1 | * | 7/2001 | Hu et al. ..................... 358/497 |

\* cited by examiner

Primary Examiner—Stephone Allen
Assistant Examiner—Christopher W. Glass

(57) ABSTRACT

A system and method for securing a moveable scanner device within a scanning system comprises a housing having a transparent platen provided thereon. The scanner device is operatively associated with the housing and is moveable along a displacement path. A drive system comprising a drive belt connected to the scanner device and a tensioning system operatively associated with the drive belt moves the scanner device along the displacement path. A control system operatively associated with the drive system actuates the drive system to move the scanner device to a stowed position along the displacement path, the location of the stowed position being such that a force exerted on the scanner device and directed along the displacement path is not transmitted to the drive belt tensioning system.

21 Claims, 2 Drawing Sheets

METHOD AND APPARATUS FOR SECURING A FLATBED SCANNER CARRIAGE

FIELD OF INVENTION

This invention relates to flatbed scanners in general and more specifically to a system for securing the moveable carriage of a flatbed scanner.

BACKGROUND

Scanner devices, such as flatbed scanners, are well-known in the art and produce machine-readable image data signals that are representative of a scanned object, such as a photograph or a page of printed text. In a typical scanner application, the image data signals produced by a scanner are used by a personal computer to reproduce an image of the scanned object on a suitable display device, such as a CRT or a printer.

A typical flatbed scanner may include illumination and optical systems to accomplish scanning of the object. The illumination system illuminates a portion of the object (commonly referred to as a "scan region"), whereas the optical system collects light reflected by the illuminated scan region and focuses a small area of the illuminated scan region (commonly referred to as a "scan line") onto the surface of a photosensitive detector positioned within the scanner. Image data representative of the entire object is obtained by sweeping the scan line across the entire object, usually by moving the illumination and optical systems with respect to the object, although other arrangements are possible.

By way of example, the illumination system may include a light source (e.g., a fluorescent or incandescent lamp or an array of light emitting diodes (LEDs)). The optical system may include a lens and/or mirror assembly to focus the image of the illuminated scan line onto the surface of the detector. Alternatively, a "contact image sensor" (CIS) may be used to collect and focus light from the illuminated scan region onto the detector.

The photosensitive detector used to detect the image light focused thereon by the optical system may be a charge-coupled device (CCD), although other devices may be used. A typical CCD may comprise an array of individual cells or "pixels," each of which collects or builds-up an electrical charge in response to exposure to light. Since the quantity of the accumulated electrical charge in any given cell or pixel is related to the intensity and duration of the light exposure, a CCD may be used to detect light and dark spots on an image focused thereon.

Regardless of the particular types and configurations of the illumination and optical systems, a typical flatbed scanner mounts the illumination system and at least a portion optical system to a moveable carriage assembly that is mounted within the housing of the flatbed scanner so that the carriage assembly can be moved back and forth underneath the transparent platen of the scanner. A drive system operatively associated with the carriage assembly moves the carriage assembly back and forth underneath the scanner platen to accomplish scanning of the object.

One problem associated with flatbed scanners of the type just described relates to the unwanted movement of the carriage assembly during transport or shipping of the flatbed scanner. Excessive movement of the carriage assembly during shipping or transport can upset the alignment or calibration of the system, possibly requiring that the system be re-aligned or re-calibrated before the scanner can be placed in service. In extreme cases, excessive movement of the carriage assembly can physically damage the carriage assembly and/or drive system, requiring repair or replacement of the damaged components before the scanner can be placed in service.

In an effort to ameliorate the foregoing problems, various types of restraining devices or shipping locks have been developed to prevent the unwanted movement of the carriage assembly during shipping or transport of the scanner. Chief among such restraining devices are screw and/or clamp assemblies, although other types of devices may be used. Typically, such devices secure the carriage assembly to the frame or chassis of the scanner, thereby substantially reducing the likelihood that the carriage assembly will be damaged during subsequent shipping or transport of the flatbed scanner. While such restraining devices or shipping locks are generally effective from a functional standpoint, they must be removed before the scanner may be used. Besides being time-consuming to accomplish (and usually requiring the use of separate tools), some users may damage the carriage and/or drive system in the process of removing the shipping locks if they are careless or if they do not have the required skills. Still other users may fail to remove the shipping restraints altogether, often leading them to erroneously conclude that the scanner device is defective.

SUMMARY OF THE INVENTION

Consequently, a need remains for a system for securing the moveable carriage of a flatbed scanner that does not suffer from the disadvantages associated with conventional shipping lock or restraining devices. Ideally, such a system for securing the carriage assembly should be inexpensive to implement, yet be easily disengaged by the user, preferably without requiring the use of separate tools. Still other advantages could be realized if such a system could be easily re-engaged to allow a user to later move the scanner to another location without fear of damaging the carriage assembly and/or drive system.

A scanning system according to one embodiment of the present invention may comprise a housing having a transparent platen provided thereon. A scanner device operatively associated with the housing is moveable along a displacement path. A drive system comprising a drive belt connected to the scanner device and a tensioning system operatively associated with the drive belt moves the scanner device along the displacement path. A control system operatively associated with the drive system actuates the drive system to move the scanner device to a stowed position along the displacement path. The location of the stowed position is such that a force exerted on the scanner device and directed along the displacement path is not transmitted to the drive belt tensioning system.

Also disclosed is a method for securing a carriage within a scanner that comprises: Providing a scanner device having a carriage assembly therein that is operatively associated with a drive system so that the carriage assembly is moveable along a displacement path, the drive system including a drive belt and a drive belt tensioning system operatively associated with the drive belt; and moving the carriage to a stowed position along the displacement path, the location of the stowed position being such that a force exerted on the carriage and directed along the displacement path is not transmitted to the drive belt tensioning system.

BRIEF DESCRIPTION OF THE DRAWING

Illustrative and presently preferred embodiments of the invention are shown in the accompanying drawing in which.

DETAILED DESCRIPTION OF THE INVENTION

A system 10 for securing a moveable carriage 12 of a scanning system 14 is shown and described herein as it could be implemented on a conventional flat-bed scanner device of the type that is well-known in the art and readily commercially available. Alternatively, and as will be described in greater detail below, the system 10 according to the present invention may be used in conjunction with other types of devices now known in the art or that may be developed in the future that utilize moveable carriage systems that need to be restrained or locked in place during shipping or transport of the device.

Figure 1:
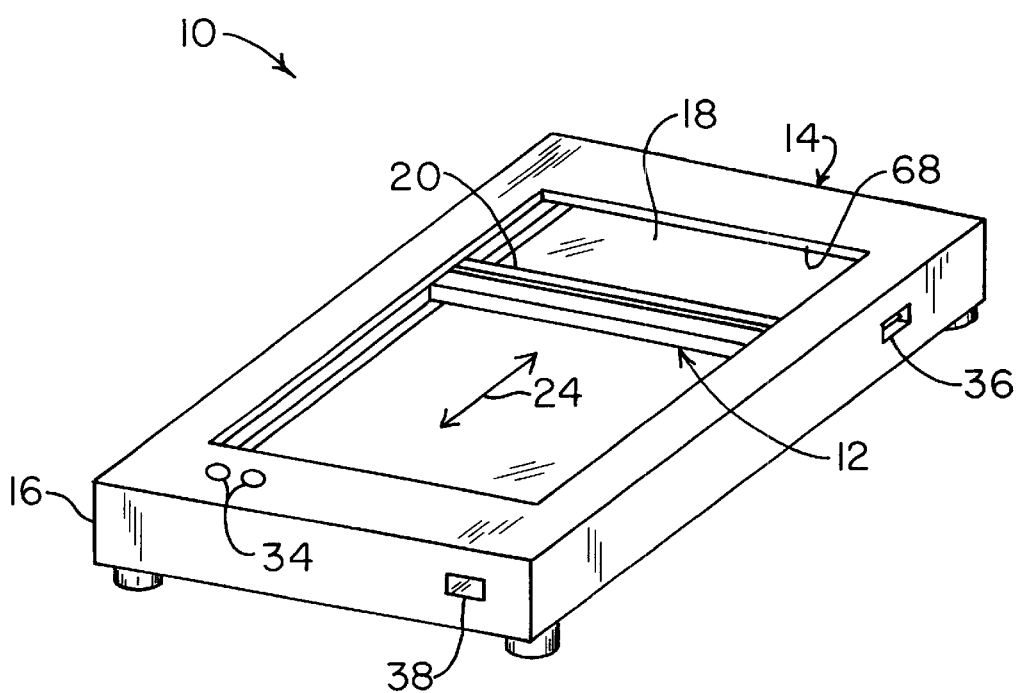
FIG. 1 is a perspective view of a flatbed scanner utilizing the system for securing the moveable carriage according to one embodiment of the present invention.

With reference now primarily to FIG. 1, the scanning system 14 may comprise a housing or chassis 16 having a transparent platen 18 provided thereon. The transparent platen 18 allows an object (not shown) positioned thereon to be scanned by the scanning system 14. The housing or chassis 16 of scanning system 14 may be provided with a cover or lid (not shown) sized to cover the object during the scanning operation. The scanning system 14 may also comprise a scanner device 20 suitable for scanning the object positioned on the transparent platen 18 and for producing electronic image data signals (not shown) representative of the scanned object. In the embodiment shown and described herein, scanner device 20 is mounted to the moveable carriage 12 within the housing 16. The carriage 12 is moveably mounted within the housing 16 so that carriage 12, thus scanner device 20, is moveable back and forth underneath the transparent platen 18, generally along a displacement path 24. A drive system 26 operatively associated with the moveable carriage 12 moves the carriage 12 back and forth underneath the platen 18 (i.e., along the displacement path 24) to allow the scanner device 20 to scan the object. See FIG. 2.

Referring back to FIG. 1, the scanning system 14 may be provided with one or more operation switches 34 to allow a user to operate the scanning system 14 as necessary to accomplish scanning of the object. The scanning system 14 may also be provided with one or more communication ports, such as a universal serial bus (USB) port 36 and/or an infra-red serial port 38 to allow image data collected by the scanning system 14 to be transferred to an external device, such as a personal computer system (not shown). In one embodiment, the scanning system 14 may derive the electrical power required for operation from the USB port 36. Alternatively, the scanning system 14 may be provided with a suitable power cord (not shown) to allow the scanning system 14 to be powered directly from a wall outlet.

Figure 2:
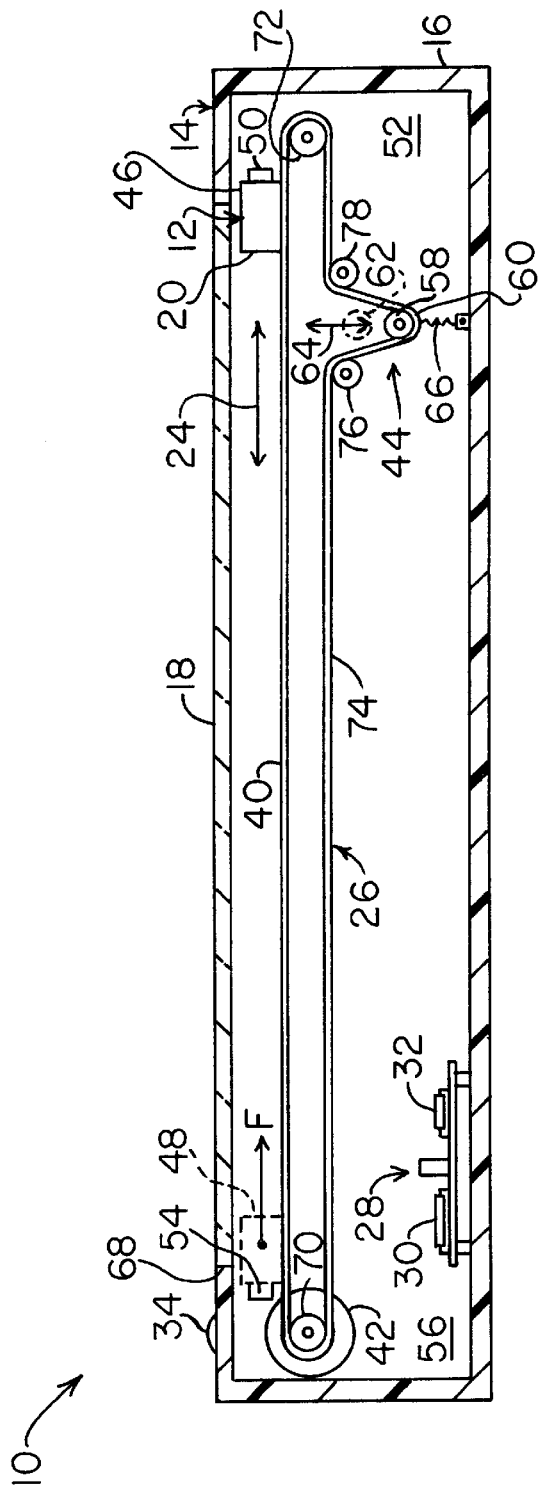
FIG. 2 is a side view in elevation of the flatbed scanner illustrated in FIG. 1 showing the carriage assembly and drive system.

The drive system 26 is best seen in FIG. 2 and, in the embodiment shown and described herein, may comprise a drive belt 40, a drive motor 42, and a drive belt tensioning system 44. The drive belt 40 is connected to the moveable carriage 12 so that movement of the drive belt 40 results in movement of the carriage 12 along the displacement path 24. That is, the drive belt 40 moves the carriage 12 between a home position 46 and an away position 48. The drive belt tensioning system 44 is provided with a moveable pulley or sprocket member 58 which is moveable between a maximum take-up position 60 and a minimum take-up position 62, i.e., in the directions generally indicated by arrow 64. A spring 66 urges or biases the moveable pulley or sprocket member 58 toward the maximum take-up position 62. The drive belt tensioning system 44 maintains a pre-selected tension in the drive belt 40 and allows the same to be operated without binding and/or other problems.

In the embodiment shown and described herein, the housing 16 of scanning device 14 is provided with a home position travel stop 50 located at about a home position end 52 of housing 16 and an away position travel stop 54 located at about an away position end 56 of housing 16. The home and away travel stops 50 and 54 prevent the carriage 12 from being moved beyond the home and away positions 46 and 48, respectively.

With reference now primarily to FIG. 2, the scanner device 20 and drive system 26 are operatively associated with a control system 28 which controls the function and operation of the two systems. For example, in the embodiment shown and described herein, the control system 28 is provided with an image data processing portion 30 and a drive system control portion 32. The image data processing portion 30 of control system 28 operates the scanner device 20 and processes the image data (not shown) produced by the scanner device 20. The image data processing portion 30 of control system 28 may be connected to the scanner device 20 provided on carriage 12 via a suitable connection or link (e.g., via "ribbon" cable, (not shown)) so that the image data processing portion 30 of control system 28 may operate the scanner device 20 and so that the electronic image data produced by the scanner device 20 may be collected and processed by the image data processing portion 30 of control system 28.

The drive system control portion 32 controls the function and operation of the drive system 26. The drive system control portion 32 of control system 28 may be operatively connected to the drive system 26 via any of a wide range of suitable connections or links (e.g., via electrically conductive cables, etc.) to allow the drive system control portion 32 to operate the drive system 26 to accomplish the scanning operation.

The system 10 of the present invention may be operated as follows to secure the moveable carriage 12 within the scanning system 14, thereby minimizing the likelihood that the carriage 12 or drive system 26 will be damaged as a result of the subsequent movement or transport of the scanning system 14. Assuming that a scanning system 14 has been provided that includes a drive system 26 as substantially described herein, the carriage 12 is secured within the scanning system 14 by moving the carriage 12 to a stowed position along the displacement path 24 so that a force F exerted on the carriage 12 and directed along the displacement path 24 is not transmitted to the drive belt tensioning system 44. In the embodiment shown and described herein, the stowed position corresponds to the away position 48 illustrated in FIG. 2. When the carriage 12 is located in the stowed position 48 it abuts on one end the away position travel stop 54. The away position travel stop 54 prevents the carriage 12 from moving beyond the away position 48. Similarly, a force F applied to the carriage 12 along the displacement path 24 generally along the direction indicated in FIG. 2 is resisted by the motor 42 of drive system 26, which effectively prevents the carriage 12 from moving back toward the home position end 52 of housing 16.

A significant advantage of the present invention is that it allows the moveable carriage 12 to be secured within the scanning device 14 without the need to resort to any additional components, such as are typically associated with conventional shipping lock restraint systems. That is, the carriage 12 can be secured within the scanning device 14 by simply moving the carriage 12 to a stowed position wherein a force exerted on the carriage and directed along the displacement path 24 is not transmitted to the drive belt tensioning system 44. Consequently, the present invention allows the carriage to be quickly and easily secured by simply instructing the control system to move the carriage to the appropriate stowed position. Since the system 10 according to the present invention does not rely on any additional components, it reduces manufacturing costs. The system 10 also does not require the end user to remove or disengage a separate shipping lock.

Still yet another advantage of the present invention is that it can be implemented at any subsequent time (e.g., by an end user) in order to prepare the scanner for transport or movement. Therefore, the system of the present invention will allow an end user to secure the carriage 12 by simply commanding the control system 28 to move the carriage 12 to the stowed position.

Having briefly described one embodiment of the system 10 for securing a moveable carriage 12 of a scanning system 14, as well as some of its more significant features and advantages, the various embodiments of the system according to the present invention will now be described in detail. However, before proceeding with the detailed description, it should be noted that the system 10 for securing a moveable carriage 12 is shown and described herein as it could be used with any of a wide range of flatbed type scanner systems having moveable carriages that are well-known in the art and that are readily commercially available. Alternatively, however, other types of devices having moveable carriages operated by similar types of drive systems may also benefit from the advantages of the present invention and may also be readily reconfigured to operate in accordance with the teachings of the present invention. Consequently, the system 10 of the present invention for securing a moveable carriage 12 should not be regarded as limited to the particular devices and environments discussed herein.

With the foregoing considerations in mind, one embodiment of a system 10 for securing a moveable carriage 12 of a scanning system 14 is shown and described herein as it could be used with a flatbed type scanner having a chassis or housing 16 having a central aperture 68 provided therein that is sized to receive a transparent platen 18. The housing 18 of scanning system 14 also may be provided with a cover or lid (not shown) that is sized to cover the object positioned on the transparent platen 18 during the scanning operation.

The housing 18 of scanning system 14 may be fabricated from any of a wide range of materials, typically plastics, suitable for the intended application and expected environment in which the scanner is to be used. However, since housings for flatbed type scanning systems, such as housing 16, are well-known in the art, the various features and attributes of the housing 16, as well as the various materials from which it may be manufactured, will not be described in further detail herein.

The transparent platen 18 may comprise any of a wide range of transparent, plate-like materials suitable for being received within the central aperture 68 defined by the housing 16. By way of example, in one preferred embodiment, the transparent platen is fabricated from glass, although other materials may also be used. The transparent platen 18 may be secured within the central aperture 68 of housing 16 by any convenient fastening device or system (e.g., by mechanical fasteners or by an adhesive) well-known in the art. Here again, since the details of providing transparent platens to scanner housings are not necessary to understand or practice the present invention, the particular mounting arrangements utilized in one preferred embodiment of the invention will not be described in further detail herein.

The scanning system 14 may be provided with one or more operation switches 34 to allow a user to operate the scanning system 14 as necessary to accomplish scanning of the object. The scanning system 14 may also be provided with one or more communication ports, such as a universal serial bus (USB) port 36 and/or an infra-red serial port 38 to allow image data collected by the scanning system 14 to be transferred to an external device, such as a personal computer system (not shown). In one embodiment, the scanning system 14 may derive the electrical power required for operation from the USB port 36. Alternatively, the scanning system 14 may be provided with a suitable power cord (not shown) to allow the scanning system 14 to be powered directly from a wall outlet.

The scanning system 14 may be provided with a line-type scanner device 20 suitable for producing electronic image data that are representative of the scanned object. The scanner device 20 may comprise any of a wide range of line-type scanning devices that are well-known in the art or that may be developed in the future. Consequently, the present invention should not be regarded as limited to any particular type of scanning device. However, by way of example, in the embodiment shown and described herein, the scanner device 20 may comprise a contact image sensor (CIS) having an integrated lens and detector assembly of the type that is well-known in the art and readily commercially available. The contact image sensor may also include an integral light source (not shown) suitable for illuminating the scan line on the object being scanned. Alternatively, the light source may comprise a separate element. However, since such line-type scanner devices, such as scanner device 20, are well-known in the art and could be easily provided by persons having ordinary skill in the art after having become familiar with the teachings of the present invention, the particular scanner device 20 utilized in one preferred embodiment of the invention will not be described in further detail herein.

The scanner device 20, (e.g., the contact image sensor and related light source) may be mounted within a carriage 12 that is moveably mounted within the housing 16 so that the assembly is free to move back and forth underneath the transparent platen 18 along a displacement path 24. In the embodiment shown and described herein, the carriage 12 is moveable between a home position 46 and an away position 48, as best seen in FIG. 2. It is generally preferred that the housing 16 be provided with a home position travel stop 50 located at about the home position end 52 of housing 16 and an away position travel stop 54 located at the away position end 56 of housing 16. The home and away position stops 50 and 54 prevent the carriage 12 from being moved beyond the home and away positions 46 and 48, respectively.

A drive system 26 operatively associated with the carriage 12 moves the carriage 12 back and forth underneath the transparent platen 18 (i.e., along the displacement path 24) to accomplish scanning of the object. In the embodiment shown and described herein, the drive system 26 comprises an endless drive belt 40, a drive motor 42, and a drive belt tensioning system 44. The drive belt 40 extends between a drive pulley or sprocket 70 provided on the drive motor 42 and an idler pulley or sprocket 72. The carriage 12 containing the scanner device 20 is operatively associated with the drive belt 40 so that movement of the drive belt 40 will cause the carriage 12 to move along the displacement path 24, generally between the home position 46 and the away position 48. In the embodiment shown and described herein, the drive motor 42 is mounted at the away position end 56 of the housing 16, whereas the idler pulley or sprocket 72 is mounted at the home position end 52 of the scanner housing 18. This arrangement allows the drive motor 72 to "pull" the carriage 12 from the home position 46 to the away position 48, thereby ensuring accurate positioning of the scanner device 20 along the displacement path 24 during the scanning operation. The carriage 12 is then returned to the home position 46 by reversing the rotation of the drive motor 72.

The belt tensioning system 44 engages the lower loop portion 74 of the drive belt 40 and may comprise a moveable sprocket or pulley 58 mounted within the housing 16 so that the moveable sprocket or pulley 58 is moveable between a maximum take-up position 60 and a minimum take-up position 62, i.e., generally in the directions indicated by arrows 64. A suitable biasing device, such as a spring 66 connected between the moveable sprocket or pulley 58 and the housing 16, biases the moveable sprocket 58 toward the maximum take-up position 60. The belt tensioning system 44 may also be provided with a pair of idler wheels or sprockets 76, 78 fixedly mounted with respect to the housing 16. The arrangement is such that the belt tensioning system maintains a substantially constant tension on the drive belt 40, thereby allowing for the smooth operation of the same and also allowing the drive system 28 to accommodate normally expected production tolerances.

The various components of the drive system 26 may comprise any of a wide range of components and devices well-known in the art and could be readily provided by persons having ordinary skill in the art after having become familiar with the teachings of the present invention. Consequently, the drive system 26 should not be regarded as limited to the particular devices and/or components shown and described herein. However, by way of example, in one preferred embodiment, the drive belt 40 may comprise a toothed drive belt having a smooth side and a toothed side. Accordingly, the various pulleys and sprockets comprising the drive system 26 may comprise either smooth pulleys or toothed sprockets depending on whether they engage the smooth side or the toothed side of the drive belt 40.

In the embodiment shown and described herein, the scanner device 20 and the drive system 26 are operatively associated with the control system 28 (FIG. 2) which controls the function and operation of the two systems. For example, the control system 28 is provided with an image data processing portion 30 which operates the scanner device 20 and processes the image data (not shown) produced by the scanner device 20. The image data processing portion 30 of control system 28 may be connected to the scanner device 20 provided on carriage 12 via a suitable connection or link (e.g., via "ribbon" cable, (not shown)) so that the image data processing portion 30 of control system 28 may operate the scanner device 20 and so that the electronic image data produced by the scanner device 20 may be collected and processed by the image data processing portion 30 of control system 28.

The control system 28 may also be provided with a drive system control portion 32 suitable for operating the drive motor 42 or other components of drive system 26. the drive system control portion 32 may be operatively connected to the drive system 26 via any of a wide range of suitable connections or links (e.g., via electrically conductive cables, etc.) well-known in the art or that may be developed in the future to allow the drive system control portion 32 to operate the drive system 24 to accomplish the scanning operation.

The system 10 of the present invention may be operated as follows to secure the moveable carriage 12 within the scanning system 14, thereby minimizing the likelihood that the carriage 12 or drive system 26 will be damaged as a result of the subsequent movement or transport of the scanning device. Consider, for example, a situation that involves a scanning system 14 having a belt-type drive system 26 of the type shown and described herein. The carriage 12 may be secured within the scanning device 14 by moving the carriage 12 to a stowed position along the displacement path 24 such that a force F exerted on the carriage 12 and directed along the displacement path 24 is not transmitted to the drive belt tensioning system 44.

The ability to isolate forces acting on the carriage 12 from the drive belt tensioning system 44 allows the carriage 12 to be secured within the scanning system 14 without having to separately restrain or secure the carriage 12 to the housing 16. For example, in the embodiment shown and described herein, the stowed position for the carriage 12 corresponds to the away position 48 illustrated in FIG. 2. That is, when the carriage 12 is located in the stowed (e.g., away) position 48, one end of the carriage 12 abuts the away position travel stop 54.

The away position travel stop 54 therefore prevents the carriage 12 from moving beyond the away position 48. Similarly, a force F applied to the carriage 12 along the displacement path 24 generally along the direction indicated in FIG. 2 is resisted by the drive motor 42 of drive system 40. The resistance offered by the drive motor 42 effectively prevents the carriage 12 from moving back toward the home position end 52 of housing 16.

The carriage 12 is not so secure at other positions along the displacement path 24. For example, if the carriage remains at the home position 46, its movement to the right (e.g., beyond the home position) is effectively resisted by the home position stop 50. However, a force acting in the opposite direction (i.e., toward the away position 48) is transmitted to the tensioning system 44, which is not able to significantly resist the force. That is, a force applied to the carriage 12 tending to move it toward the away position 48 will be transmitted by the drive belt 40 to the tensioning system 44. This transmitted force will be applied to the moveable pulley or sprocket 58 and spring 66, causing the sprocket 58 to move toward the minimum take-up position 62. Such movement of the sprocket 58 toward the minimum take-up position 62 reduces the tension in the drive belt 40 and may result in the movement of the carriage 12 toward the away position 48. While such carriage movement is in itself undesirable, the reduced tension in the drive belt 40 can cause it to "jump" one or more teeth on the various toothed sprockets (e.g., 70, 72) comprising the drive system 46. Such a displacement or jumping of the drive belt can cause subsequent problems in the alignment and calibration of the drive system 26 (e.g., specifically the position of the carriage 12) which can result in the malfunctioning or non-functioning of the scanning system 14.

Movement of the carriage 12 to the stowed position can be accomplished by instructing the control system 28 to actuate the drive system 26 to move the carriage 12 to the stowed position. For example, in one embodiment the control system 28 may be so instructed via scanner interface software (not shown) running on a host computer system connected to the scanning system 14. The scanner interface software may be provided with a suitable icon or check box that, when "clicked" or "checked" via a suitable pointing device, will cause the control system 28 to move the carriage 12 to the stowed position (e.g., the away position 48). Alternatively, the control system 28 can be instructed to move the carriage 12 to the stowed position via a button or switch (e.g., switch 34) provided on the scanning system 14 itself. When the switch is actuated, the control system 28 will respond by moving the carriage 12 to the stowed position (e.g., the away position 48). Still yet other alternatives are possible for so instructing the control system 28 to move the carriage 12 to the stowed position, as would be obvious to persons having ordinary skill in the art after having become familiar with the teachings of the present invention. consequently, the present invention should not be regarded as limited to the particular methods described herein for instructing the control system 28 to move the carriage 12 to the stowed position.

It is contemplated that the inventive concepts herein described may be variously otherwise embodied and it is intended that the appended claims be construed to include alternative embodiments of the invention except insofar as limited by the prior art.

What is claimed is:

1. A method, comprising:
   providing a scanning system having a carriage assembly therein that is operatively associated with a drive system so that the carriage assembly is moveable along a displacement path, the drive system including a drive belt, the carriage being mounted to the drive belt, and a drive belt tensioning system operatively associated with the drive belt; and
   moving the carriage to a stowed position along the displacement path, the location of the stowed position being such that a force exerted on the carriage and directed along the displacement path is not transmitted to the drive belt tensioning system.

2. The method of claim 1, further comprising transporting the scanning system to another location.

3. The method of claim 2, further comprising moving the carriage to a home position along the displacement path after completing the step of transporting the scanning system to another location.

4. The method of claim 3, further comprising operating the scanning system to scan an object after completing the step of moving the carriage to the home position.

5. Scanner apparatus, comprising:
   a scanner device operatively associated with a housing so that said scanner device is moveable along a displacement path;
   a drive system operatively associated with said scanner device, said drive system moving said scanner device along the displacement path, said drive system comprising
      a drive belt, said scanner device being mounted to said drive belt; and
      a drive belt tensioning system operatively associated with said drive belt; and
   a control system operatively associated with said drive system, said control system actuating said drive system to move said scanner device to a stowed position along the displacement path, the location of the stowed position being such that a force exerted on said scanner device and directed along the displacement path is not transmitted to said drive belt tensioning system.

6. The scanner apparatus of claim 5, further comprising a travel stop mounted to said housing, said scanner device engaging said travel stop when said scanner device is located at the stowed position.

7. The scanner apparatus of claim 6, wherein said scanner device further comprises a carriage for holding said scanner device, said carriage being operatively associated with said drive system so that said drive system moves said carriage along the displacement path.

8. The scanner apparatus of claim 5, wherein said drive system further comprises an idler sprocket mounted to said housing at about a home position end of said housing and a drive sprocket mounted to said housing at about an away position end of said housing, said drive belt engaging said idler sprocket and said drive sprocket and extending therebetween so that said drive belt defines an upper section and a lower section, said drive belt moving said scanner device between a home position located at about the home position end of said housing and an away position located at about the away position end of said housing.

9. The scanner apparatus of claim 8, wherein said scanner device is operatively associated with the upper section of said drive belt and wherein said drive belt tensioning system is operatively associated with the lower section of said drive belt.

10. The scanner apparatus of claim 9, wherein said drive belt tensioning system further comprises:
    a tensioning sprocket moveably mounted to said housing so that said tensioning sprocket is moveable between a maximum take-up position and a minimum take-up position, said tensioning sprocket engaging said drive belt; and
    a biasing device operatively associated with said tensioning sprocket, said biasing device urging said tensioning sprocket toward the maximum take-up position.

11. The scanner apparatus of claim 10, wherein said travel stop is mounted to the away position end of said housing and wherein the stowed position is substantially coincident with the away position.

12. The scanner apparatus of claim 5, further comprising an image processing system operatively associated with said scanner device.

13. The scanner apparatus of claim 12, wherein said scanner device further comprises:
    a contact image sensor system; and
    an illumination system.

14. Scanner apparatus, comprising:
    a scanner device operatively associated with a housing so that said scanner device is moveable along a displacement path adjacent a platen portion of said housing;
    a drive system operatively associated with said scanner device, said drive system moving said scanner device along the displacement path, said drive system comprising
       a drive belt, said scanner device being mounted to said drive belt; and
       a drive belt tensioning system operatively associated with said drive belt; and
    a control system operatively associated with said drive system, said control system actuating said drive system to move said scanner device to a stowed position along the displacement path, the location of the stowed position being such that a force exerted on said scanner device and directed along the displacement path is not transmitted to said drive belt tensioning system.

15. The scanner apparatus of claim 14, further comprising a travel stop mounted to said housing and wherein said drive system further comprises an idler sprocket mounted to said housing at about a home position end of said housing and a drive sprocket mounted to said housing at about an away position end of said housing, said drive belt engaging said idler sprocket and said drive sprocket and extending therebetween so that said drive belt defines an upper section and a lower section, said drive belt moving said scanner device between a home position located at about the home position end of said housing and an away position located at about the away position end of said housing.

16. The scanner apparatus of claim 15, wherein said scanner device is operatively associated with the upper section of said drive belt and wherein said drive belt tensioning system is operatively associated with the lower section of said drive belt.

17. A method, comprising:
   providing a scanner device having a carriage assembly therein that is operatively associated with a drive system so that the carriage assembly is moveable along a displacement path, the drive system including a drive belt, the carriage being mounted to the drive belt, and a drive belt tensioning system operatively associated with the drive belt; and
   operating the drive system of the scanner device to move the carriage to a stowed position along the displacement path, the location of the stowed position being such that a force exerted on the carriage and directed along the displacement path is prevented from reaching the drive belt tensioning system.

18. The method of claim 17, further comprising moving the scanner device.

19. The method of claim 18, further comprising operating the drive system of the scanner device to move the carriage to a home position along the displacement path after completing the step of moving the scanner device.

20. The method of claim 19, further comprising operating the scanner device to scan an object after completing the step of operating the drive system of the scanner device to move the carriage to the home position.

21. The method of claim 14, further comprising an image processing system operatively associated with said scanner device.

* * * * *